(12) United States Patent
Ju (10) Patent No.: US 11,846,208 B2
(45) Date of Patent: Dec. 19, 2023

(54) APPARATUS FOR DISASSEMBLING AND ASSEMBLING LOWER VANE CARRIER AND METHOD FOR DISASSEMBLING AND ASSEMBLING LOWER VANE CARRIER USING SAME

(71) Applicant: DOOSAN ENERBILITY CO., LTD., Changwon (KR)

(72) Inventor: Eui Jun Ju, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/857,594

(22) Filed: Jul. 5, 2022

(65) Prior Publication Data

US 2023/0097337 A1   Mar. 30, 2023

(30) Foreign Application Priority Data

Sep. 29, 2021   (KR) .......................... 10-2021-0128696

(51) Int. Cl.
*F01D 25/28* (2006.01)
*F01D 9/04* (2006.01)
*F01D 25/24* (2006.01)

(52) U.S. Cl.
CPC ............. *F01D 9/042* (2013.01); *F01D 25/24* (2013.01); *F01D 25/285* (2013.01); *F05D 2230/64* (2013.01); *F05D 2230/70* (2013.01); *F05D 2240/14* (2013.01); *F05D 2260/31* (2013.01)

(58) Field of Classification Search
CPC .... B23P 19/04; F01D 25/285; F05D 2230/70; F05D 2230/64; F23R 3/60; F23R 2900/00017; F23R 2900/00019
See application file for complete search history.

(56) References Cited

U.S. PATENT DOCUMENTS

| 3,493,212 | A  | * | 2/1970  | Scalzo  | F01D 25/285 |
|-----------|----|---|---------|---------|-------------|
|           |    |   |         |         | 415/127     |
| 6,224,332 | B1 | * | 5/2001  | Leach   | F01D 25/26  |
|           |    |   |         |         | 415/214.1   |
| 10,060,449| B2 |   | 8/2018  | I       |             |
| 10,132,198| B2 | * | 11/2018 | Baba    | F01D 25/28  |
| 10,711,649| B2 | * | 7/2020  | Carter  | F02C 3/04   |
| 2009/0081030 | A1 | * | 3/2009 | Sullivan | F16B 35/06 |
|           |    |   |         |         | 411/366.1   |
| 2015/0267563 | A1 |   | 9/2015 | Huber    |             |

(Continued)

FOREIGN PATENT DOCUMENTS

| DE | 2128245 A | 12/1971 |
| EP | 2213846 B1 | 4/2015 |
| JP | 4572394 B2 | 11/2010 |

(Continued)

*Primary Examiner* — Christopher J Besler
(74) *Attorney, Agent, or Firm* — Harvest IP Law, LLP (57) ABSTRACT

An apparatus for disassembling and assembling a lower vane carrier and a method for disassembling and assembling the lower vane carrier by using the apparatus are proposed. The apparatus includes a rolling jig that is mounted on the lower vane carrier mounted inside a lower turbine casing, a bolt member that passes through a region where the rolling jig and the lower vane carrier are in contact with each other, and a block member mounted adjacent to the bolt member and configured to prevent the bolt member from being separated.

14 Claims, 7 Drawing Sheets

(56) References Cited

U.S. PATENT DOCUMENTS

2022/0048647 A1 * 2/2022 Henriksen ............ F01D 25/285

FOREIGN PATENT DOCUMENTS

| JP | 2011-12733 A | 1/2011 |
| JP | 2011-012733 A | 1/2011 |
| JP | 2015-094182 A | 5/2015 |
| JP | 2017-207016 A | 11/2017 |
| KR | 10-2000-0077119 A | 12/2000 |
| WO | 2009-054050 A1 | 4/2009 |
| WO | 2009054050 A1 | 1/2012 |

* cited by examiner

APPARATUS FOR DISASSEMBLING AND ASSEMBLING LOWER VANE CARRIER AND METHOD FOR DISASSEMBLING AND ASSEMBLING LOWER VANE CARRIER USING SAME

CROSS REFERENCE TO RELATED APPLICATION

The present application claims priority to Korean Patent Application No. 10-2021-0128696, filed on Sep. 29, 2021, the entire contents of which are incorporated herein for all purposes by this reference.

BACKGROUND OF THE INVENTION

1. Field of the Invention

The present disclosure relates to an apparatus and a method for disassembling a lower vane carrier mounted on a lower turbine casing from the lower turbine casing and for assembling the disassembled lower vane carrier to the lower turbine casing.

2. Description of the Background Art

A turbo machine refers to an apparatus that generates a driving force used to generate electric power by using fluid (e.g., gas) passing through the turbo machine. Therefore, a turbo machine is usually installed and used together with a generator. Examples of a turbo machine include a gas turbine, a steam turbine, a wind power turbine, or the like. The gas turbine is an apparatus that generates combustion gas by mixing compressed air with natural gas and generates a driving force for generation of electric power by using the combustion gas. The steam turbine is an apparatus that heats water to generate steam and generates a driving force for generation of electric power by using the steam. A wind turbine is an apparatus that converts wind power into a driving force for generation of electric power.

The gas turbine includes a compressor, a combustor, and a turbine. The compressor includes a plurality of compressor vanes and a plurality of compressor blades which are alternately provided in a compressor casing. In addition, the compressor is configured to draw external air in through a compressor inlet scroll strut. The drawn in air is compressed by the compressor vanes and the compressor blades while passing through an inner portion of the compressor. The combustor receives the compressed air compressed at the compressor, and mixes the compressed air with fuel. In addition, the combustor ignites fuel mixed with compressed air by using an igniter, thereby generating high-temperature and high-pressure combustion gas. The combustion gas is supplied to the turbine. The turbine includes a plurality of turbine vanes and a plurality of turbine blades which are alternately arranged in a turbine casing. The turbine passes the combustion gas supplied from the combustor through an inner portion of the turbine. The combustion gas passing through the inner portion of the turbine rotates the turbine blades, and the combustion gas that has completely passed through the inner portion of the turbine is discharged from the turbine through a turbine diffuser.

The steam turbine includes an evaporator and a turbine. The evaporator generates steam by heating water supplied from the outside. Similar to the turbine in the gas turbine, the turbine of the steam turbine includes a plurality of turbine vanes and a plurality of turbine blades which are alternately arranged in a steam turbine casing. However, while the gas turbine uses combustion gas to rotate the turbine blades, the turbine of the steam turbine rotates the turbine blades by passing steam through an inner portion of the turbine, the steam being generated from the evaporator.

The turbines of the gas turbine and the steam turbine includes a turbine rotor and a turbine stator. Further, the turbine stator includes a turbine casing, a vane carrier mounted on an inner circumferential surface of the turbine casing, and a plurality of turbine vanes which is mounted on an inner circumferential surface of the vane carrier and disposed along a circumferential direction of the vane carrier. The vane carrier and the plurality of turbine vanes that is coupled to the vane carrier are disposed in a multi-stage structure along an axial direction of the turbine casing. In addition, the turbine casing includes an upper turbine casing and a lower turbine casing. The turbine casing is divided into the upper turbine casing (half) and the lower turbine casing (half) by an imaginary horizontal plane passing through a center of the turbine casing. The vane carrier includes an upper vane carrier and a lower vane carrier that are respectively mounted on the upper turbine casing and the lower turbine casing. The plurality of turbine vanes also includes a plurality of upper turbine vanes mounted on the upper vane carrier, and a plurality of lower turbine vanes mounted on the lower vane carrier.

In a situation in which a vane carrier is required to be repaired or replaced due to, for example, a damage to a corresponding vane carrier at a specific stage, the corresponding vane carrier at the specific stage is required to be disassembled from the turbine casing. A worker may directly access the upper vane carrier when the upper turbine casing is removed. However, for the lower vane carrier, even if the upper vane carrier at the corresponding stage is removed, it is difficult to access the lower vane carrier at the corresponding stage due to the adjacent upper vane carrier at a different stage.

Various apparatus for use in maintenance work have been proposed in prior art, for example the apparatus disclosed in U.S. Publication No. 2016/0222829, which may be used in disassembling the lower vane carrier from the lower turbine casing. In prior art, in order to disassemble the lower vane carrier from the lower turbine casing, a rolling jig is mounted on a lower vane carrier at a desired stage, the rolling jig and the lower vane carrier are rotated together as a whole, and then the lower vane carrier is pulled toward an upper portion of the lower turbine casing. However, apparatus disclosed in prior art for disassembling and assembling a lower vane carrier requires an excessively high number of components and an additional machining process. In addition, various components of the disassembling and assembling apparatus may fall downward when the rolling jig and the lower vane carrier are rotated as a whole.

SUMMARY OF THE INVENTION

Accordingly, the present disclosure has been made to solve the above problems occurring in the related art, and to provide an apparatus and method for disassembling and assembling a lower vane carrier that does not require a large number of components and additional machining process. The apparatus is capable of preventing falling and separating of components while the lower turbine casing is disassembled.

According to an aspect of the present disclosure to achieve the above-described objective, there is provided an apparatus for disassembling and assembling a lower vane carrier, the apparatus including: a rolling jig that is mounted on the lower vane carrier mounted inside a lower turbine casing; a bolt member that passes through a region where the rolling jig and the lower vane carrier are in contact with each other; and a block member mounted adjacent to the bolt member and configured to prevent the bolt member from being separated.

The bolt member may include: a stem portion that passes through the lower vane carrier and the rolling jig; and a head portion that is connected to a first end of the stem portion, wherein a diameter of the head portion is larger than a diameter of the stem portion. Further, the block member may be disposed at a position close to the head portion of the bolt member.

The head portion may be disposed at a position close to the rolling jig, and the stem portion may pass through a position close to the lower vane carrier from the position close to the rolling jig.

The stem portion may include: a first stem portion having a first end connected to the head portion and having an outer circumferential surface provided with an external thread; and a second stem portion connected to a second end of the first stem portion. Further, the lower vane carrier may be provided with a first internal thread which is formed in a position where the stem portion is inserted thereinto and to which the external thread of the first stem portion is fastened.

The second stem portion may have a diameter smaller than a diameter of the first stem portion.

On the basis of an imaginary axial direction that passes through a center between the lower vane carrier and the rolling jig, the block member may include: a pair of side surface block portions spaced apart from each other along the axial direction with respect to the head portion; and a connection block portion connecting the pair of side surface block portions to each other.

The pair of side surface block portions may have a vertical length longer than a vertical length of the head portion, and the connection block portion may be spaced apart from the head portion.

The bolt member may further include a protrusion portion connected to a second end of the stem portion and formed in a polygonal column shape, the protrusion portion being configured such that a wrench for rotating the bolt member is mounted on the protrusion portion.

The protrusion portion may have a hollow shape, and may have an inner portion provided with a second internal thread such that an eyebolt for pulling the bolt member toward the lower vane carrier is inserted and fastened into the inner portion of the protrusion portion.

On the basis of the imaginary axial direction that passes through a center between the lower vane carrier and the rolling jig, the lower vane carrier may include: a first carrier member and a second carrier member that are spaced apart from each other along the axial direction; and a carrier body connecting the first carrier member and the second carrier member to each other. Further, the rolling jig may include: a first jig member in contact with the first carrier member; a second jig member which is spaced apart from the first jig member along the axial direction and which is in contact with the second carrier member; and a plurality of jig connection portions which connects the first jig member and the second jig member to each other, wherein each of the plurality of jig connection portions is spaced apart from each other along a circumferential direction of the first jig member.

An insertion groove may be formed on an inner circumferential surface of the lower turbine casing, and the first carrier member may have a diameter larger than a diameter of the carrier body and may be configured to be inserted into the insertion groove. Further, when the rolling jig and the lower vane carrier are rotated together as a whole with respect to the axial direction as a central axis, the first carrier member may be separated from the insertion groove and the first jig member may be inserted into the insertion groove.

The lower vane carrier may further include a carrier flange through which the bolt member passes, wherein the carrier flange is disposed between the first carrier member and the second carrier member, disposed radially outside of the carrier body, and disposed at a position close to the rolling jig. Further, the rolling jig may further include a jig flange on which the block member is mounted, wherein the rolling is disposed between the first jig member and the second jig member, and disposed such that the jig flange is in contact with the carrier flange.

Each of the plurality of jig connection portions may include: a connection body disposed between the first jig member and the second jig member; and a winding protrusion which protrudes along the circumferential direction of the first jig member from the connection body and on which a rope for rotating the rolling jig is wound.

A jig through-hole to which an eyebolt is fastened may be formed in an outer surface of the connection body on the basis of a radial direction of the rolling jig, wherein the rope passes through the eyebolt.

The lower turbine casing may be provided with a protrusion step that protrudes radially inward from an inner circumferential surface of the lower turbine casing, and the second carrier member may have a diameter smaller than a diameter of the first carrier member. Further, the second carrier member may be disposed such that the second carrier member is facing the protrusion step, and the second jig member may have a diameter smaller than a diameter of the first jig member. Further, in a state in which the second carrier member is facing the protrusion step, when the rolling jig and the lower vane carrier are rotated together as a whole with respect to the axial direction as a central axis, the second carrier member may be separated from the protrusion step and the second jig member may face the protrusion step.

The lower turbine casing may be provided with an insertion groove that is formed on an inner circumferential surface of the lower turbine casing, and a protrusion step may protrude from a position that is spaced apart from the insertion groove along the axial direction. Further, the carrier flange may radially protrude outward further than the second carrier member and may be disposed between the insertion groove and the protrusion step, and the jig flange may radially protrude outward further than the second jig member. Further, in a state in which the carrier flange is disposed between the protrusion step and the insertion groove, when the rolling jig and the lower vane carrier are rotated together as a whole with respect to the axial direction as a central axis, the carrier flange may be separated from the lower vane carrier and the jig flange may be disposed between the protrusion step and the insertion groove.

According to another aspect of the present disclosure, there is provided a method for disassembling a lower vane carrier, the method including: (A) preparing an apparatus for disassembling and assembling the lower vane carrier, the apparatus including a rolling jig that is mounted on the lower vane carrier mounted inside a lower turbine casing, a bolt member that passes through a region where the rolling jig and the lower vane carrier are in contact with each other, and a block member mounted adjacent to the bolt member and configured to prevent the bolt member from being separated; (B) mounting the rolling jig on the lower vane carrier after an upper turbine casing is disassembled from the lower turbine casing and an upper vane carrier and an upper turbine vane mounted on the upper vane carrier are disassembled from the lower vane carrier; (C) passing the bolt member through the region where the rolling jig and the lower vane carrier are in contact with each other; (D) mounting the block member such that the block member is positioned adjacent to the bolt member; (E) positioning the rolling jig on the lower turbine casing by rotating the lower vane carrier and the rolling jig together as a whole with respect to an imaginary axial direction that passes through a center between the lower vane carrier and the rolling jig; and (F) disassembling the lower vane carrier disposed at a position above the rolling jig according to a process of the (E) from the rolling jig.

A process of the (F) may be performed such that the lower vane carrier is disassembled from the rolling jig by pulling the lower vane carrier upward after the external thread of the bolt member is separated from the first internal thread of the lower vane carrier while the bolt member is moved downward by rotating the bolt member.

According to a further aspect of the present disclosure, there is provided a method for assembling a lower vane carrier, the method including: (A) preparing an apparatus for disassembling and assembling the lower vane carrier, the apparatus including a rolling jig that is mounted on the lower vane carrier mounted inside a lower turbine casing, a bolt member that passes through a region where the rolling jig and the lower vane carrier are in contact with each other, and a block member mounted adjacent to the bolt member and configured to prevent the bolt member from being separated; (B) passing the bolt member through the lower vane carrier while the lower vane carrier is seated on the rolling jig from above the rolling jig simultaneously when the rolling jig is in a state in which the rolling jig is positioned on the lower turbine casing and the bolt member and the block member are mounted on the rolling jig; (C) fastening an external thread of the bolt member to a first internal thread of the lower vane carrier by rotating the bolt member after the bolt member is pulled upward; (D) mounting the lower vane carrier on the lower turbine casing by rotating the lower vane carrier and the rolling jig together as a whole with respect to an imaginary axial direction that passes through a center between the lower vane carrier and the rolling jig so that the rolling jig is separated from the lower turbine casing; and (E) disassembling the rolling jig from the lower vane carrier after the block member and the bolt member are disassembled from the rolling jig and the lower vane carrier.

A process of the (C) may be performed such that the external thread of the first stem portion is fastened to the first internal thread of the lower vane carrier by mounting the wrench on an outer circumferential surface of the protrusion portion and rotating the wrench after the bolt member is pulled by pulling the eyebolt upward while the eyebolt is in a state in which the eyebolt is fastened to the second internal thread of the inner portion of the protrusion portion.

According to the apparatus for disassembling and assembling the lower vane carrier and to the method for disassembling and assembling the lower vane carrier using the apparatus of the present disclosure, since the bolt member passes through a region where the rolling jig and the lower vane carrier are in contact with each other and the block member is mounted adjacent to the bolt member and the block member surrounds the bolt member, a problem that the bolt member falls toward the lower turbine casing when the lower vane carrier is disassembled from the rolling jig after the rolling jig and the lower vane carrier are rotated can be prevented.

In addition, according to the present disclosure, since the apparatus for disassembling and assembling the lower vane carrier is designed in a structure that includes the rolling jig, the bolt member, and the block member, the number of components can be reduced compared to a conventional apparatus, and the lower vane carrier is also can be disassembled from or assembled to the lower turbine casing without performing an additional machining process.

DETAILED DESCRIPTION OF THE INVENTION

While the present disclosure will be described with respect to specific embodiments illustrated in the accompanying drawings, these are only for illustrative purposes, and it will be apparent to those skilled in the art that various changes and other equivalent embodiments may be derived from the specific embodiments. Accordingly, the scope of the present disclosure should be determined by the reasonable interpretation of the appended claims and their legal equivalents rather than by the examples given.

Hereinafter, the present disclosure will be described with reference to the accompanying drawings under an assumption that a turbo machine in which an apparatus and a method for disassembling and assembling a lower vane carrier according to the present disclosure are applied is a gas turbine. However, the turbo machine in which the apparatus and the method for disassembling and assembling the lower vane carrier according to the present disclosure are not limited to a gas turbine but can be used in any apparatus equipped with a turbine.

Figure 1:
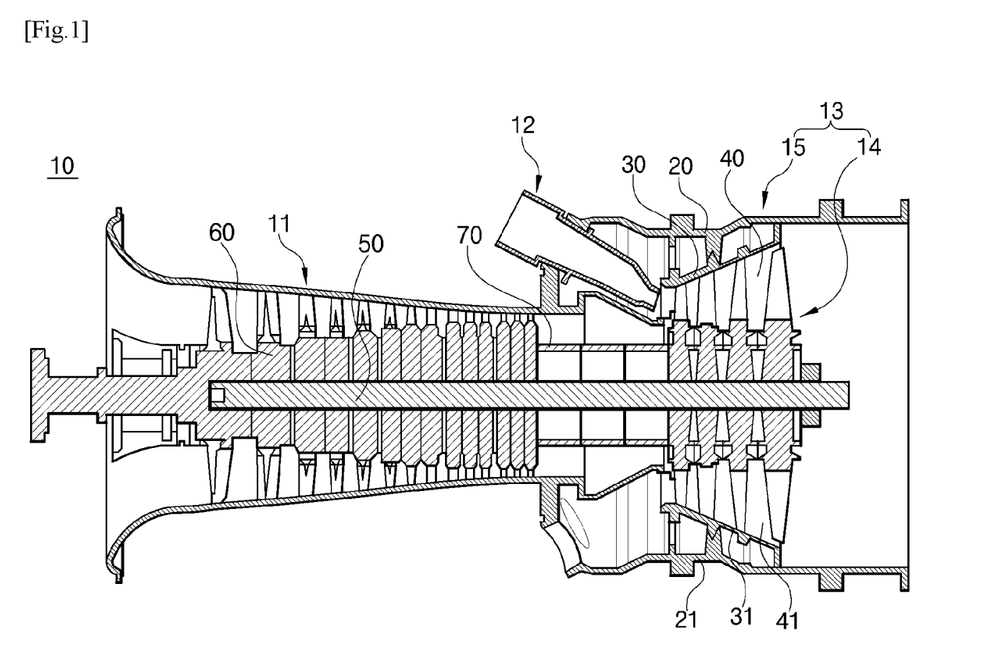
FIG. 1 is a cross-sectional view illustrating a gas turbine.

Referring to FIG. 1, a gas turbine 10 includes a compressor 11, a combustor 12, and a turbine 13. On the basis of a flow direction of gas (compressed air or combustion gas), the compressor 11 is disposed at an upstream side of the gas turbine 10, and the turbine 13 is disposed at a downstream side of the gas turbine 10. In addition, the combustor 12 is disposed between the compressor 11 and the turbine 13.

The compressor 11 accommodates compressor vanes and compressor rotors in a compressor casing, and the turbine 13 accommodates turbine vanes 40 and 41 and turbine rotors 14 in a turbine casing 20 and 21. The compressor vanes and the compressor rotors are disposed in a multi-stage structure along the flow direction of compressed air. The turbine vanes 40 and 41 and the turbine rotors 14 are also disposed in a multi-stage structure along the flow direction of compressed gas. Here, the compressor 11 is designed such that an internal space thereof is gradually decreased from a front stage to a rear stage so that air taken into the compressor 11 can be compressed. In contrast, the turbine 13 is designed such that an internal space thereof is gradually increased from a front stage to a rear stage so that combustion gas supplied from the combustor 12 can be expanded.

Meanwhile, a torque tube 70 functioning as a torque transmission member for transmitting rotational torque generated from the turbine 13 to the compressor 11 is disposed between the compressor rotor that is positioned at the rearmost stage of the compressor 11 and the turbine rotor 14 that is positioned at the foremost stage of the turbine 13. As illustrated in FIG. 1, the torque tube 70 may be configured of a plurality of torque tube disks arranged in a three-stage structure, but this is only one of various embodiments of the present disclosure. Further, the torque tube 70 may be configured of a plurality of torque tube disks arranged in four or more stages or in two or fewer stages.

Each compressor rotor includes a compressor disk 60 and compressor blades. In the compressor casing, a plurality (e.g., fourteen) of compressor disks 60 are provided, and each of the compressor disks 60 is coupled by a tie rod 50 such that the compressor disks 60 are not spaced apart from each other in an axial direction. In more detail, with the tie rod 50 passing through each central portion of the compressor disks 60, each of the compressor disks 60 is arranged along the axial direction. In addition, the compressor disks 60 adjacent to each other are disposed such that facing surfaces of adjacent compressor disks 60 are pressed by the tie rod 50 so that the adjacent compressor disks 60 cannot rotate relative to each other.

A plurality of compressor blades is radially coupled to an outer circumferential surface of each of the compressor disks 60. In addition, a plurality of compressor vanes is disposed between the compressor blades, wherein the plurality of compressor vanes is mounted on an inner circumferential surface of the compressor casing and formed in an annular shape on the basis of respective stages. Unlike the compressor disks 60 configured to rotate about their axis of rotation, the plurality of compressor vanes is configured to be stationary and does not rotate. Further, the compressor vanes is configured to align a flow of compressed air passed through the compressor blades positioned at the upstream side and to guide the compressed air to the compressor blades positioned at the downstream side. Here, the compressor casing and the compressor vanes are collectively referred to as a compressor stator in order to distinguish the compressor casing and the compressor vanes from the compressor rotors.

The tie rod 50 is disposed to pass through central portions of the plurality of compressor disks 60 and turbine disks that will be described later. Further, a first end portion of the tie rod 50 is fastened to an inner portion of the compressor disk 60 that is positioned at the foremost side of the compressor 11, and a second end portion of the tie rod 50 is fastened by a fixing nut.

A shape of the tie rod 50 is not limited to the shape illustrated in FIG. 1, and the tie rod 50 may be formed in various shapes depending on the needs in the a gas turbine. That is, one shape in which a tie rod is passing through the central portions of the compressor disks 60, another shape in which a plurality of tie rods is arranged in a circumferential direction, or a combination of the above two shapes may be used.

Although not illustrated, a deswirler functioning as a guide vane may be mounted in the compressor 11 of the gas turbine 10 so as to adjust a flow angle of fluid to a designed flow angle, and thereby increases a pressure of the fluid entering an inlet of the combustor 12.

The combustor 12 where the compressed air is mixed with fuel ignites the fuel mixture to generate high-temperature and high-pressure combustion gas having high energy, and increases, through an isobaric combustion, the temperature of the combustion gas to a heat-resistant temperature limit at which components of the combustor 12 and components of the turbine 13 can endure.

The combustor 12 configuring a combustion system of the gas turbine 10 may include a plurality of combustors arranged in a combustor casing formed in a cell shape. Each of the combustors includes a nozzle for ejecting fuel, a liner forming a combustion chamber, and a transition piece serving as a connection portion between the combustor 12 and the turbine 13.

In detail, the liner provides a combustion space in which fuel ejected from the nozzle is mixed with compressed air supplied from the compressor 11 and then combusted. In the liner, the combustion chamber providing the combustion space in which the fuel mixed with air is combusted and a liner annular channel forming an annular space surrounding the combustion chamber are formed. In addition, the nozzle for ejecting fuel is coupled to a front end of the liner, and an igniter is coupled to a side wall of the liner.

Compressed air introduced through a plurality of holes formed in an outer wall of the liner flows in the liner annular channel. Further, compressed air used to cool the transition piece that will be described below also flows through liner channel. As such, since compressed air flows along the outer wall of the liner, the liner may be prevented from being damaged by heat generated by combustion of fuel in the combustion chamber.

The transition piece is connected to a rear end of the liner so as to transfer combustion gas combusted by an ignition plug toward the turbine 13. In the same manner as the liner, the transition piece includes a transition piece annular channel surrounding an internal space of the transition piece. Further, an outer wall of the transition piece is cooled by compressed air flowing along the transition piece annular channel so that the transition piece may be prevented from being damaged by high-temperature combustion gas.

High-temperature and high-pressure combustion gas discharged from the combustor 12 is supplied into the turbine 13. The high-temperature and high-pressure combustion gas supplied into the turbine 13 expands while passing through an inner portion of the turbine 13, thereby applying impulsive and reaction force to turbine blades to generate a rotational torque. The rotational torque is transmitted to the compressor 11 via the torque tube 70. Additional rotational torque in excess of the torque required to drive the compressor 11 is used to drive a generator or the like.

The turbine 13 basically has a structure similar to that of the compressor 11. The turbine 13 includes the plurality of turbine rotors 14. Each turbine rotor 14 also includes a turbine disk, and a plurality of turbine blades radially disposed on the turbine disk. The plurality of turbine vanes 40 and 41 are provided between the turbine blades, wherein the plurality of turbine vanes 40 and 41 is mounted on an inner circumferential surface of the turbine casing 20 and 21 and formed in an annular shape on the basis of respective stages. Further, the turbine vanes 40 and 41 guide the flow direction of combustion gas passing through the turbine blades. Here, the turbine casing 20 and 21 and the turbine vanes 40 and 41 are collectively referred to as a turbine stator 15 in order to distinguish the turbine casing 20 and 21 and the turbine vanes 40 and 41 from the turbine rotors 14.

The turbine stator 15 may include the turbine casing 20 and 21, a vane carrier 30 and 31 mounted on an inner circumferential surface of the turbine casing 20 and 21, and the plurality of turbine vanes 40 and 41 mounted on an inner circumferential surface of the vane carrier 30 and 31 and disposed along a circumferential direction of the vane carrier 30 and 31. The vane carrier 30 and 31 and the plurality of turbine vanes 40 and 41 coupled to the vane carrier 30 and 31 are disposed in a multi-stage structure along an axial direction of the turbine casing 20 and 21. In addition, the turbine casing 20 and 21 includes an upper turbine casing 20 and a lower turbine casing 21. The turbine casing 20 and 21 is divided into the upper turbine casing 20 and a lower turbine casing 21 by an imaginary horizontal plane passing through a center of the turbine casing 20 and 21. The vane carrier 30 and 31 includes an upper vane carrier 30 and a lower vane carrier 31 that are respectively mounted on the upper turbine casing 20 and the lower turbine casing 21. The plurality of turbine vanes 40 and 41 includes a plurality of upper turbine vanes 40 mounted on the upper vane carrier 30, and a plurality of lower turbine vanes 41 mounted on the lower vane carrier 31.

Referring to FIGS. 2 to 10, an apparatus (100; hereinafter, referred to as a 'disassembling and assembling apparatus') for disassembling and assembling a lower vane carrier according to the present disclosure includes a rolling jig 110, a bolt member 120, and a block member 130. The rolling jig 110 is mounted on the lower vane carrier 31. The bolt member 120 passes through a portion where the rolling jig 110 and the lower vane carrier 31 are in contact with each other. The block member 130 is mounted adjacent to the bolt member 120, and prevents the bolt member 120 from being separated.

Figure 2:
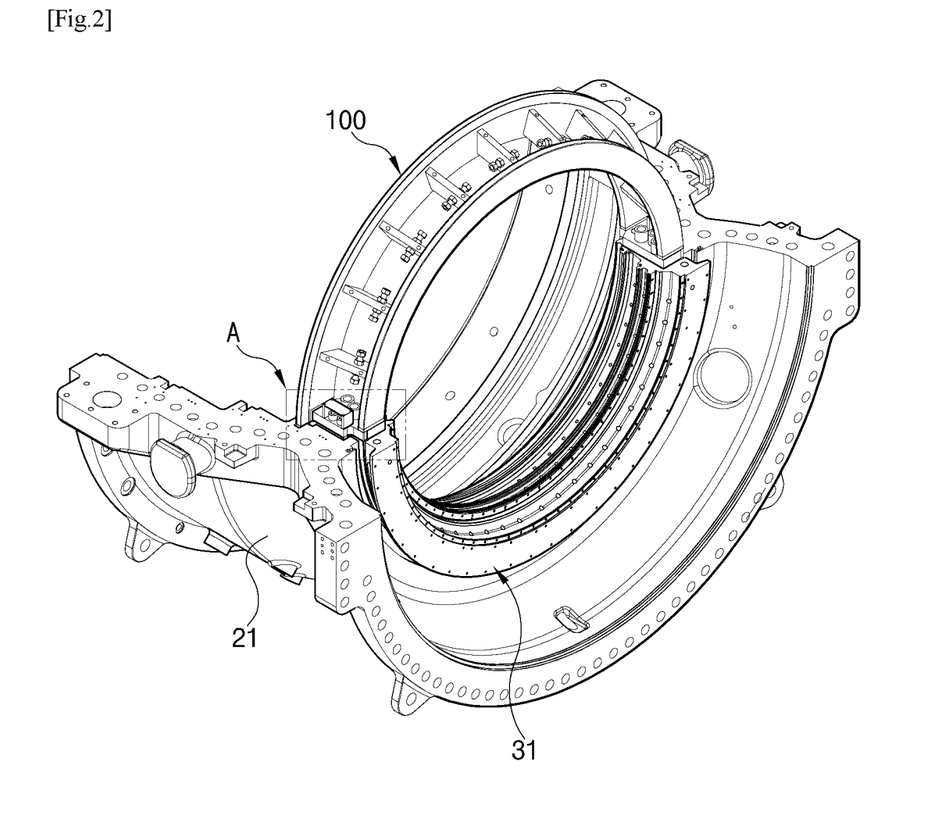
FIG. 2 is a perspective view illustrating a structure in which an apparatus for disassembling and assembling a lower vane carrier is mounted on the lower vane carrier while the lower vane carrier is in a state of being mounted on a lower turbine casing.

An axial direction described hereafter is defined as a direction that passes through a center of the gas turbine 10. The axial direction passes through a center of the vane carrier 31 and the rolling jig 110 when the vane carrier 31 and the rolling jig 110 are connected as shown in FIG. 2, and is also a longitudinal direction of the tie rod 50. A flow direction of combustion gas that flows inside the turbine 13 may be referred to as a part of the axial direction. Hereinafter, the upstream side on the basis of the flow direction of combustion gas is defined as a front direction, and the downstream side on the basis of the flow direction of combustion gas is defined as a rear direction. Meanwhile, a circumferential direction and a radial direction may be defined as a circumferential direction and a radial direction of the turbine casing 20 and 21, the vane carrier 30 and 3,1 or the rolling jig 110.

Figure 3:
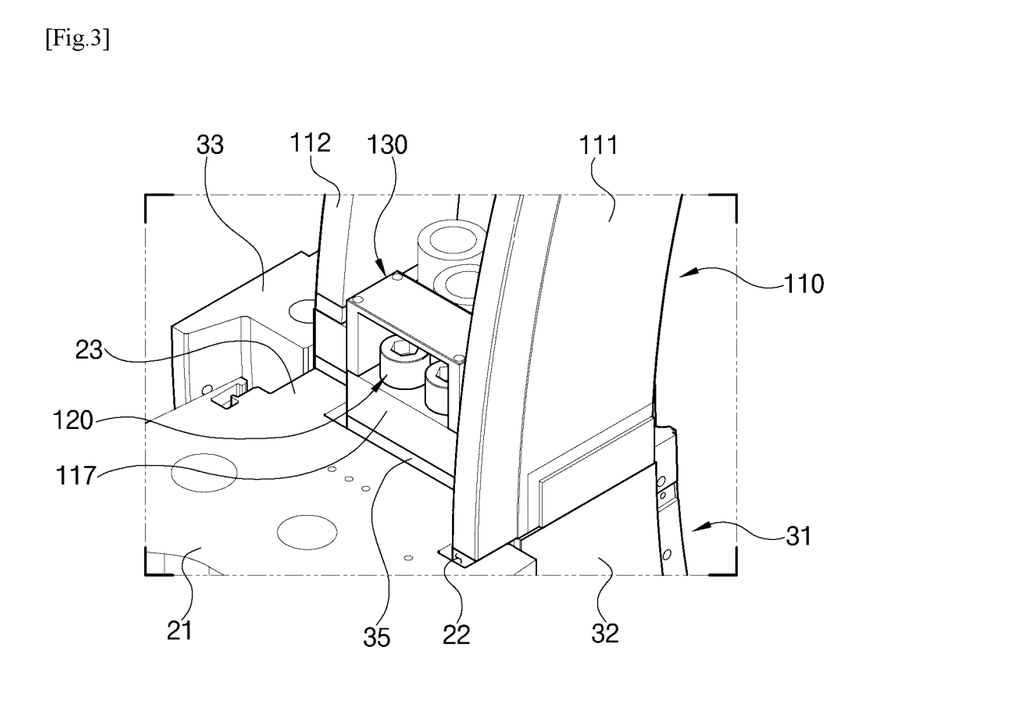
FIG. 3 is an enlarged view illustrating a portion A in FIG. 2.
Figure 4:
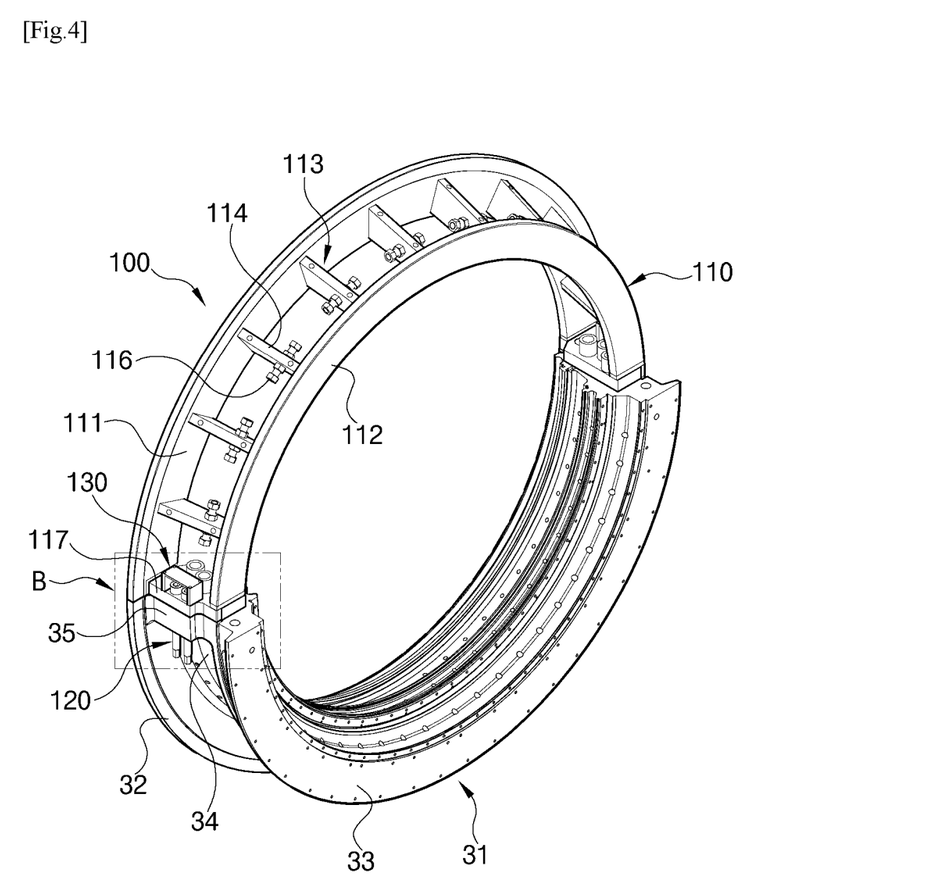
FIG. 4 is a perspective view illustrating the lower vane carrier and the apparatus for disassembling and assembling the lower vane carrier illustrated in FIG. 2.

Referring to FIG. 3, an insertion groove 22 and a protrusion step 23 are formed on an inner circumferential surface of the lower turbine casing 21. The insertion groove 22 is formed in an annular shape that extends along the circumferential direction. The protrusion step 23 protrudes radially inward from the inner circumferential surface of the lower turbine casing 21 at a position spaced apart from the insertion groove 22 in the front direction.

Referring to FIGS. 2 to 5, the lower vane carrier 31 includes a first carrier member 32, a second carrier member 33, a carrier body 34, and a carrier flange 35. The first carrier member 32 is formed in a semicircular ring shape. The second carrier member 33 is formed in a semicircular ring shape. Further, the second carrier member 33 is spaced apart from the first carrier member 32 in the front direction, and is formed such that a diameter (more particularly, an outer diameter) of the second carrier member 33 is smaller than a diameter of the first carrier member 32. The carrier body 34 is formed in a semicircular ring shape, and connects the first carrier member 32 and the second carrier member 33 to each other. The carrier flange 35 is disposed between the first carrier member 32 and the second carrier member 33. Further, the carrier flange 35 is disposed radially outside of the carrier body 34 at a position close to the rolling jig 110. The bolt member 120 passes through the carrier flange 35.

Referring to FIGS. 2 to 5, the rolling jig 110 includes a first jig member 111, a second jig member 112, a jig connection portion 113, and a jig flange 117. The first jig member 111 is formed in a semicircular ring shape, and is in contact with the first carrier member 32. The second jig member 112 is formed in a semicircular ring shape. Further, the second jig member 112 is spaced apart from the first jig member 111 in the front direction, and is in contact with the second carrier member 33. The second jig member 112 is formed such that a diameter (more particularly, an outer diameter) of the second jig member 112 is smaller than a diameter of the first jig member 111. The jig connection portion 113 positioned between the first jig member 111 and the second jig member 112 connects the first jig member 111 and the second jig member 112 to each other. A plurality of jig connection portions are spaced apart from each other along the circumferential direction. The jig flange 117 is disposed between the first jig member 111 and the second jig member 112. Further, the jig flange 117 is disposed at a position close to the lower vane carrier 31, and is disposed to be in contact with the carrier flange 35. The jig flange 117 radially protrudes outward further than the second jig member 112. The block member 130 is mounted on the jig flange 117.

Figure 8:
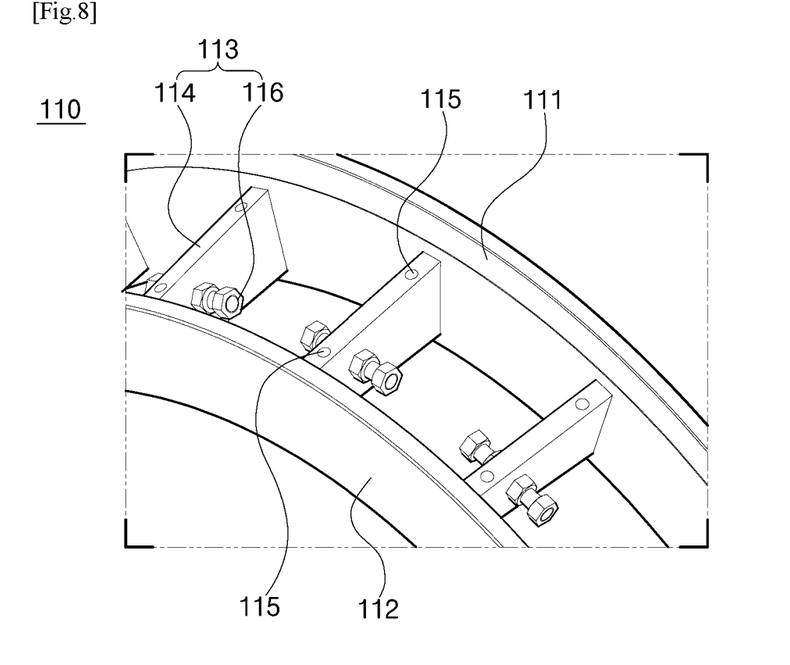
FIG. 8 is an enlarged view illustrating an upper portion of a rolling jig in FIG. 4.

Referring to FIG. 8, each of the jig connection portions 113 includes a connection body 114 and a winding protrusion 116. The connection body 114 is disposed between the first jig member 111 and the second jig member 112, is arranged along the axial direction, and connects the first jig member 111 and the second jig member 112 to each other. The winding protrusion 116 protrudes along the circumferential direction from the connection body 114. Jig through-holes 115 may be formed in a radially outer surface of the connection body 114. Eyebolts (not illustrated) may be fastened to the jig through-holes 115. In a state in which the disassembling and assembling apparatus 100 is fully mounted on the lower vane carrier 31, the eyebolts are inserted into the jig through-holes 115, and the rope that has passed through the eyebolts is wound on the winding protrusion 116. Then, the lower vane carrier 31 and the rolling jig 11 can be rotated together as a whole, for example 180 degrees, with respect to the axial direction as a central axis by pulling the rope along the circumferential direction by external force.

Figure 5:
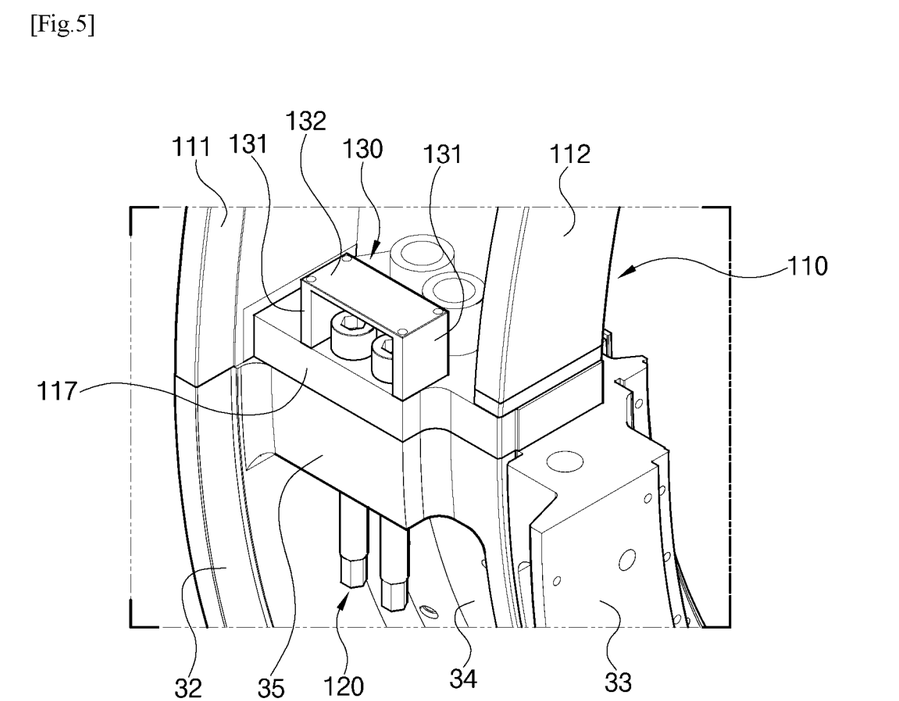
FIG. 5 is an enlarged view illustrating a portion B in FIG. 4.
Figure 7:
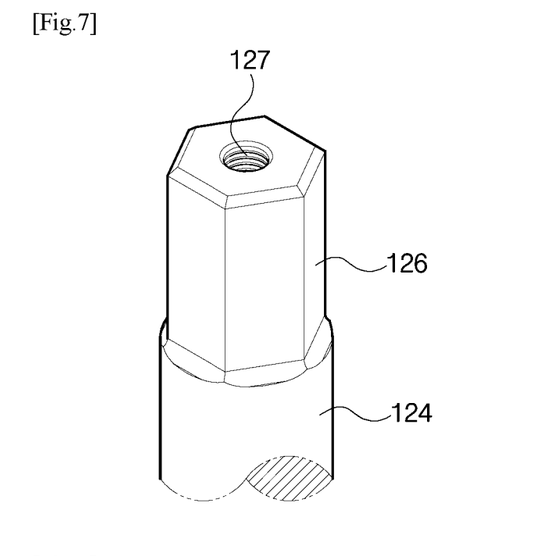
FIG. 7 is an enlarged view illustrating a protrusion portion illustrated in FIG. 6.

Referring to FIGS. 5 and 7, the bolt member 120 includes a stem portion 121, a head portion 125, and a protrusion portion 126. The stem portion 121 passes through the lower vane carrier 31 and the rolling jig 110. The head portion 125 is connected to a first end of the stem portion 121, and is formed such that a diameter of the head portion 125 is larger than a diameter of the stem portion 121. The protrusion portion 126 is connected to a second end of the stem portion 121, and is formed in a polygonal column shape. Further, a wrench (not illustrated) for rotating the bolt member 120 is mounted on the protrusion portion 126.

Figure 6:
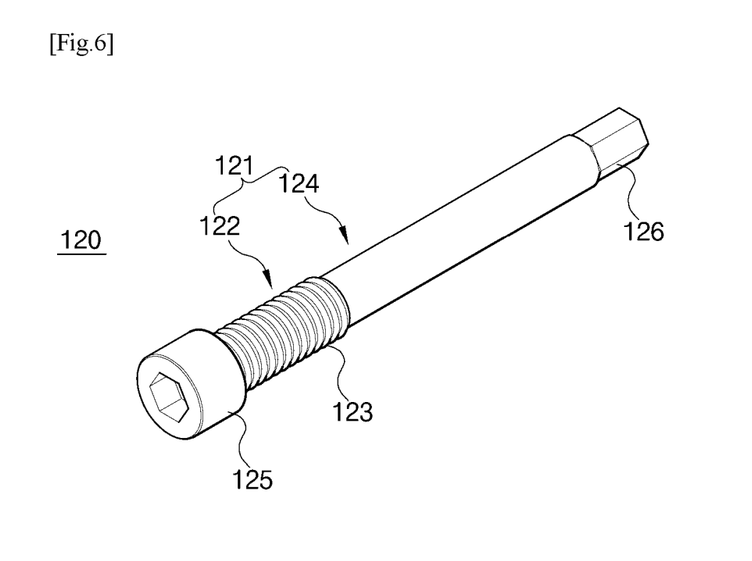
FIG. 6 is a perspective view illustrating bolt members illustrated in FIG. 5.

Referring to FIG. 6, the head portion 125 is disposed on a position close to the rolling jig 110, and the stem portion 121 passes from the position close to the rolling jig 110 to a position close to the lower vane carrier 31. In addition, the block member 130 is disposed on a position close to the head portion 125 of the bolt member 120. The stem portion 121 includes a first stem portion 122 and a second stem portion 124. The head portion 125 is connected to a first end of the first stem portion 122, and an external thread 123 is formed on an outer circumferential surface of the first stem portion 122. The second stem portion 124 is connected to a second end of the first stem portion 122. A through-hole (not illustrated) into which the stem portion 121 is inserted is formed in the carrier flange 35, and a first internal thread (not illustrated) used to be fastened with the external thread 123 of the first stem portion 122 is formed on an inner wall of the through-hole. The second stem portion 124 is formed such that a diameter of the second stem portion 124 is smaller than a diameter of the first stem portion 122. When the stem portion 121 is inserted into the through-hole of the carrier flange 35, the first stem portion 122 is inserted into the through-hole after the second stem portion 124 is inserted into the through-hole. In order for the second stem portion 124 not to be fastened to and not to be caught by the first internal thread of the through-hole, the second stem portion 124 is formed such that the diameter of the second stem portion 124 is smaller than the diameter of the first stem portion 122. After the stem portion 121 is completely inserted into the carrier flange 35, the head portion 125 is seated on the jig flange 117.

Figure 9:
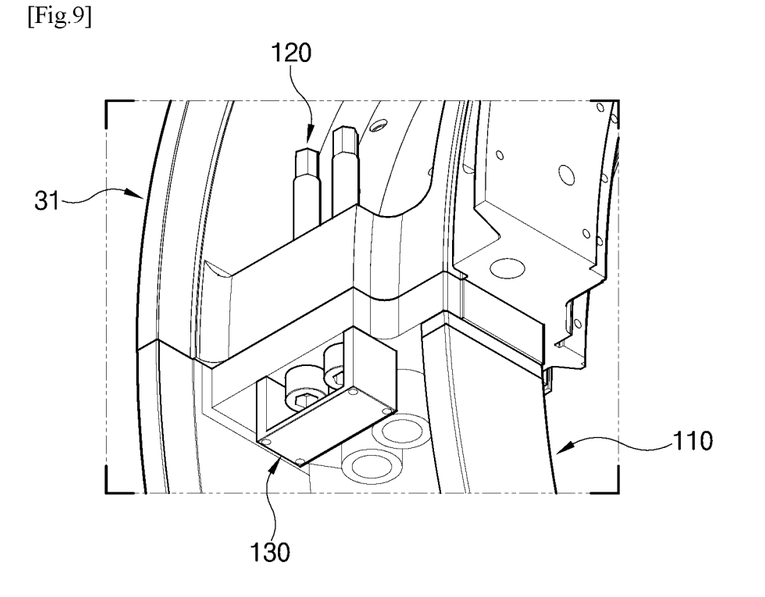
FIG. 9 is a view illustrating a state in which the rolling jig and the lower vane carrier are inverted up and down as the rolling jig and the lower vane carrier are rotated with respect to a central axis.

Referring to FIG. 7, the protrusion portion 126 is formed in a hollow shape, and a second internal thread 127 is formed on an inner portion of the protrusion portion 126 so that the eyebolt (not illustrated) for pulling the bolt member 120 toward the lower vane carrier 31 is inserted into and fastened to the protrusion portion 126. After the disassembling and assembling apparatus 100 is completely mounted on the lower vane carrier 31 as illustrated in FIG. 2 and FIG. 5 and the rolling jig 110 and the lower vane carrier 31 are rotated together as a whole as illustrated in FIG. 9, the lower vane carrier 31 is pulled upward to disassemble the lower vane carrier 31 from the rolling jig 110. Thereafter, when a worker wants to assemble the lower vane carrier 31 to the rolling jig 110, a process in which the stem portion 121 passes through the carrier flange 35 while the lower vane carrier 31 is seated on the rolling jig 110 is performed. Specifically, after the worker mounts the eyebolt on the second internal thread 127 of the protrusion portion 126 and pulls the bolt member 120 upward, the worker disassembles the eyebolt from the protrusion portion 126, and rotates the protrusion portion 126 by using the wrench fastened to an outer circumferential surface of the protrusion portion 126. In this situation, the bolt member 120 is rotated, and the external thread 123 of the first stem portion 122 is fastened to the first internal thread of the carrier flange 35. Thereafter, the lower vane carrier 31 and the rolling jig 110 are rotated so that the lower vane carrier 31 is mounted on the lower turbine casing 21 and the rolling jig 110 is positioned on an upper portion of the lower turbine casing 21.

Referring to FIG. 3 and FIG. 5, the block member 130 includes a pair of side surface block portions 131 and a connection block portion 132. The pair of side surface block portions 131 is spaced apart from each other along the axial direction with respect to the head portion 125. Between the pair of side surface block portions 131, the connection block portion 132 connects the pair of side surface block portions 131 to each other. The pair of side surface block portions 131 is formed such that a vertical length of the pair of side surface block portions 131 is longer than a vertical length of the head portion 125. In addition, the connection block portion 132 is spaced apart from the head portion 125.

Figure 10:
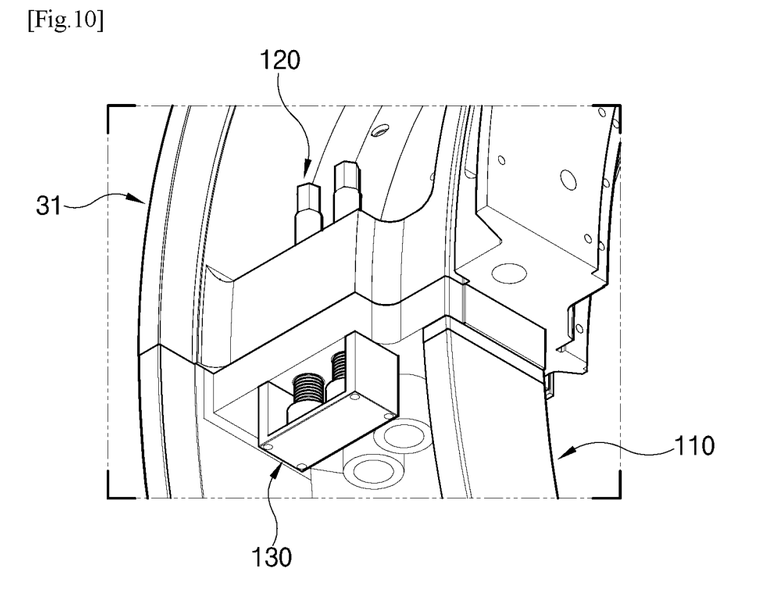
FIG. 10 is a view illustrating a state in which each external thread of the bolt members in FIG. 9 is disassembled from each first internal thread of the lower vane carrier and then is moved downward.

After the worker mounts the rolling jig 110 on the lower vane carrier 31 as illustrated in FIG. 5 and rotates the rolling jig 110 and the lower vane carrier 31 as illustrated in FIG. 9, when the worker wants to pull the lower vane carrier 31 upward from the rolling jig 110, the worker loosens the bolt member 120 as illustrated in FIG. 10 such that the bolt member is disassembled from the carrier flange 35. At this time, since the bolt member 120 is seated on the block member 130 and maintains a state of being caught on the block member 130, the bolt member 120 does not fall downward.

Meanwhile, the diameter (more particularly, the outer diameter) of the first carrier member 32 is larger than the diameter of the carrier body 34, and the first carrier member 32 is inserted into the insertion groove 22. In addition, in a state in which the first carrier member 32 is inserted into the insertion groove 22, when the rolling jig 110 and the lower vane carrier 31 are rotated together as a whole with respect to the axial direction as the central axis, the first carrier member 32 is separated from the insertion groove 22 and the first jig member 111 is inserted into the insertion groove 22.

The second carrier member 33 is disposed such that the second carrier member 33 is facing the protrusion step 23. In addition, in a state in which the second carrier member 33 is facing the protrusion step 23, when the rolling jig 110 and the lower vane carrier 31 are rotated together as a whole with respect to the axial direction as the central axis, the second carrier member 33 is separated from the protrusion step 23 and the second jig member 112 is facing the protrusion step 23.

The carrier flange 35 radially protrudes outward further than the second carrier member 33, and may be disposed between the insertion groove 22 and the protrusion step 23. However, when the rolling jig 110 and the lower vane carrier 31 are rotated together as a whole with respect to the axial direction as the central axis, the carrier flange 35 is separated from the lower vane carrier 31 and the jig flange 117 is disposed between the insertion groove 22 and the protrusion step 23.

Hereinafter, a process of disassembling the lower vane carrier 31 from the lower turbine casing 21 by using the disassembling and assembling apparatus 100, and a process of assembling the lower vane carrier 31 to the lower turbine casing 21 again after the disassembling process is performed will be described.

Firstly, the process of disassembling the lower vane carrier 31 from the lower turbine casing 21 by using the disassembling and assembling apparatus 100 will be described.

The worker prepares the disassembling and assembling apparatus 100 as described above. Then, the worker disassembles the upper turbine casing 20 from the lower turbine casing 21, and mounts the rolling jig 110 on the lower vane carrier 31 after the worker disassembles the upper vane carrier 30 and the upper turbine vane 40 mounted on the upper vane carrier 30.

Then, the worker passes the stem portion 121 of the bolt member 120 through a portion where the rolling jig 110 and the lower vane carrier 31 are in contact with each other, i.e., the jig flange 117 and the carrier flange 35. At this time, the worker fastens the external thread 123 of the first stem portion 122 to the first internal thread of the carrier flange 35 by rotating the bolt member 120.

Thereafter, the worker mounts the block member 130 such that the block member 130 surrounds the head portion 125 of the bolt member 120. Then, the worker rotates the lower vane carrier 31 and the rolling jig 110 together as a whole in order to place the rolling jig 110 on the lower turbine casing 21. In a state in which the eyebolt is mounted on the jig through-hole 115 and the rope passed through the jig through-hole 115 is wound on the winding protrusion 116, the lower vane carrier 31 and the rolling jig 11 can be rotated by pulling the rope along the circumferential direction.

Finally, the worker disassembles the lower vane carrier 31 disposed on the upper portion of the rolling jig 110 from the rolling jig 110. Specifically, after the worker separates the external thread 123 of the first stem portion 122 from the first internal thread of the carrier flange 35 by rotating and moving the bolt member 120 downward, the worker disassembles the lower vane carrier 31 from the rolling jig 110 by pulling the lower vane carrier 31 upward.

Next, the process of assembling the lower vane carrier 31 to the lower turbine casing 21 by using the disassembling and assembling apparatus 100 will be described.

By the disassembling process as described above, the rolling jig 110 is positioned on the lower turbine casing 21, and bolt member 120 and the block member 130 are mounted on the rolling jig 110. In addition, the lower vane carrier 31 is in a state in which the lower vane carrier 31 is separated from the rolling jig 110. In this situation, the worker seats the lower vane carrier 31 on the rolling jig 110 from above the rolling jig 110, and passes the bolt member 120 through the lower vane carrier 31 at the same time.

After the worker pulls and rotates the bolt member 120 upward, the worker fastens the external thread 123 of the first stem portion 122 to the first internal thread of the carrier flange 35. Specifically, in a state in which the eyebolt is fastened to the second internal thread 127 inside the protrusion portion 126, after the worker pulls the bolt member 120 by pulling the eyebolt upward, the worker fastens the external thread 123 of the first stem portion 122 to the first internal thread of the carrier flange 35 by mounting the wrench on the outer circumferential surface of the protrusion portion 126 and rotating the wrench.

Then, the worker rotates the lower vane carrier 31 and the rolling jig 110 together as a whole to place the lower vane carrier 31 on the lower turbine casing 21. That is, the worker returns the lower vane carrier 31 to an original position of the lower vane carrier 31.

Finally, after the worker disassembles the block member 130 and the bolt member 120 from the rolling jig 110 and the lower vane carrier 31, the worker disassembles the rolling jig 110 from the lower vane carrier 31. Thereafter, the worker assembles the upper vane carrier 30 and the upper turbine vane 40 to the lower vane carrier 31, and assembles the upper turbine casing 20 to the upper vane carrier 30, so that a repair work and a maintenance work for the turbine stator 15 is completed.

Although the present disclosure has been described with reference to the embodiments illustrated in the drawings, the described embodiments are merely illustrative, so those skilled in the art will understand that various modifications and equivalents thereof can be made therefrom. Therefore, the true technical scope of the present disclosure should be determined by the technical spirit of the appended claims.

The invention claimed is:

1. An apparatus for disassembling and assembling a lower vane carrier, the apparatus comprising:
    a rolling jig mountable on the lower vane carrier mounted inside a lower turbine casing, the rolling jig being in a semicircular ring shape;
    a bolt member configured to pass, in a circumferential direction of the rolling jig, through a region where the rolling jig and the lower vane carrier are in contact with each other; and
    a block member mounted adjacent to the bolt member and configured to prevent the bolt member from being separated,
    wherein the bolt member comprises: a stem portion configured to pass through the lower vane carrier and the rolling jig; and a head portion that is connected to a first end of the stem portion, wherein a diameter of the head portion is larger than a diameter of the stem portion, and
    wherein the block member is disposed at a position close to the head portion of the bolt member,
    wherein the bolt member further comprises a protrusion portion connected to a second end of the stem portion and formed in a polygonal column shape, the protrusion portion being configured such that a wrench for rotating the bolt member is mounted on the protrusion portion,
    wherein the protrusion portion has a hollow shape, and has an inner portion provided with an internal thread such that an eyebolt for pulling the bolt member toward the lower vane carrier is inserted and fastened into the inner portion of the protrusion portion.

2. The apparatus of claim 1, wherein the head portion is disposed at a position close to the rolling jig, and the stem portion configured to pass through a position close to the lower vane carrier from the position close to the rolling jig.

3. The apparatus of claim 1, wherein the stem portion comprises:
    a first stem portion having a first end connected to the head portion and having an outer circumferential surface provided with an external thread; and
    a second stem portion connected to a second end of the first stem portion,
    wherein the external thread is configured to be fastened to an internal thread formed in the lower vane carrier when the stem portion passes through the lower vane carrier.

4. The apparatus of claim 3, wherein the second stem portion has a diameter smaller than a diameter of the first stem portion.

5. The apparatus of claim 1, wherein, on a basis of an imaginary axial direction that passes through a center between the lower vane carrier and the rolling jig, the block member comprises:
    a pair of side surface block portions spaced apart from each other along the axial direction with respect to the head portion; and a connection block portion connecting the pair of side surface block portions to each other.

6. The apparatus of claim 5, wherein the pair of side surface block portions has a vertical length longer than a vertical length of the head portion, and the connection block portion is spaced apart from the head portion.

7. An apparatus for disassembling and assembling a lower vane carrier, the apparatus comprising:
a rolling jig mountable on the lower vane carrier mounted inside a lower turbine casing, the rolling jig being in a semicircular ring shape;
a bolt member configured to pass, in a circumferential direction of the rolling jig, through a region where the rolling jig and the lower vane carrier are in contact with each other; and
a block member mounted adjacent to the bolt member and configured to prevent the bolt member from being separated,
wherein, on a basis of an imaginary axial direction that passes through a center between the lower vane carrier and the rolling jig,
the lower vane carrier comprises:
a first carrier member and a second carrier member that are spaced apart from each other along the axial direction; and
a carrier body connecting the first carrier member and the second carrier member to each other, and
the rolling jig comprises:
a first jig member configured to be in contact with the first carrier member;
a second jig member which is spaced apart from the first jig member along the axial direction and is configured to be in contact with the second carrier member; and
a plurality of jig connection portions which connects the first jig member and the second jig member to each other, wherein each of the plurality of jig connection portions are spaced apart from each other along a circumferential direction of the first jig member,
wherein each of the plurality of jig connection portions comprises: a connection body disposed between the first jig member and the second jig member; and a winding protrusion which protrude along the circumferential direction of the first jig member from the connection body and on which a rope for rotating the rolling jig is wound.

8. The apparatus of claim 7, wherein an insertion groove is formed on an inner circumferential surface of the lower turbine casing,
the first carrier member has a diameter larger than a diameter of the carrier body and is configured to be inserted into the insertion groove, and
when the rolling jig and the lower vane carrier are rotated together as a whole with respect to the axial direction as a central axis, the first carrier member is separated from the insertion groove and the first jig member is inserted into the insertion groove.

9. The apparatus of claim 7,
wherein the lower vane carrier further comprises a carrier flange disposed between the first carrier member and the second carrier member, disposed radially outside of the carrier body, and the carrier flange is configured to be disposed at a position close to the rolling jig, and the bolt member is configured to pass through the carrier flange,
wherein the rolling jig further comprises a jig flange on which the block member is mounted, the jig flange is disposed between the first jig member and the second jig member, and the jig flange is configured to be disposed at a position in contact with the carrier flange.

10. The apparatus of claim 7, wherein a jig through-hole to which an eyebolt is fastened is formed in an outer surface of the connection body on the basis of a radial direction of the rolling jig, wherein the rope passes through the eyebolt.

11. The apparatus of claim 7, wherein the lower turbine casing is provided with a protrusion step that protrudes radially inward from an inner circumferential surface of the lower turbine casing,
the second carrier member has a diameter smaller than a diameter of the first carrier member, and
the second carrier member is disposed such that the second carrier member is facing the protrusion step, the second jig member has a diameter smaller than a diameter of the first jig member, and, in a state in which the second carrier member is facing the protrusion step, when the rolling jig and the lower vane carrier are rotated together as a whole with respect to the axial direction as a central axis, the second carrier member is separated from the protrusion step and the second jig member is facing the protrusion step.

12. The apparatus of claim 9, wherein the lower turbine casing is provided with an insertion groove that is formed on an inner circumferential surface of the lower turbine casing,
a protrusion step protrudes from a position that is spaced apart from the insertion groove along the axial direction,
the carrier flange radially protrudes outward further than the second carrier member and is disposed between the insertion groove and the protrusion step,
the jig flange radially protrudes outward further than the second jig member, and
in a state in which the carrier flange is disposed between the protrusion step and the insertion groove, when the rolling jig and the lower vane carrier are rotated together as a whole with respect to the axial direction as a central axis, the carrier flange is separated from the lower vane carrier and the jig flange is disposed between the protrusion step and the insertion groove.

13. An apparatus for disassembling and assembling a lower vane carrier, the apparatus comprising:
a rolling jig mountable on the lower vane carrier mounted inside a lower turbine casing, the rolling jig being in a semicircular ring shape, the rolling jig including a jig flange disposed at a position to be in contact with the lower vane carrier when the rolling jig is mounted on the lower vane carrier; a bolt member configured to pass, in a circumferential direction of the rolling jig, through a region where the rolling jig and the lower vane carrier are in contact with each other; and
a block member mounted adjacent to the bolt member and configured to prevent the bolt member from being separated,
wherein the bolt member comprises: a stem portion configured to pass through the lower vane carrier and the rolling jig; and a head portion that is connected to a first end of the stem portion, wherein a diameter of the head portion is larger than a diameter of the stem portion, and
wherein the block member is disposed at a position close to the head portion of the bolt member,
wherein, on a basis of an imaginary axial direction that passes through a center between the lower vane carrier and the rolling jig, the block member comprises:
a pair of side surface block portions spaced apart from each other along the axial direction having the head portion disposed between the pair of side surface block portions, the pair of side surface block portions mounted on and protruding from the jig flange in the circumferential direction away from the lower vane carrier; and a connection block portion connecting the pair of side surface block portions to each other and disposed over the head portion in the circumferential direction.

14. The apparatus of claim 13, wherein a vertical length of the pair of side surface block portions protruding from the jig flange is longer than a vertical length of the head portion and shorter than the vertical length of the bolt member.

\* \* \* \* \*